(12) United States Patent
Soderqvist

(10) Patent No.: US 12,031,371 B2
(45) Date of Patent: *Jul. 9, 2024

(54) SWING DOOR OPERATOR OPERABLE IN POWERED AND POWERLESS MODE

(71) Applicant: Assa Abloy Entrance Systems AB, Landskrona (SE)

(72) Inventor: Sven-Gunnar Soderqvist, Vallakra (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 245 days.

This patent is subject to a terminal disclaimer.

(21) Appl. No.: 17/615,632

(22) PCT Filed: Jun. 4, 2020

(86) PCT No.: PCT/EP2020/065466
§ 371 (c)(1),
(2) Date: Dec. 1, 2021

(87) PCT Pub. No.: WO2020/249456
PCT Pub. Date: Dec. 17, 2020

(65) Prior Publication Data
US 2022/0307313 A1   Sep. 29, 2022

(30) Foreign Application Priority Data

Jun. 13, 2019 (SE) .................................. 1930189-4

(51) Int. Cl.
*E05F 15/00* (2015.01)
*E05F 1/10* (2006.01)
(Continued)

(52) U.S. Cl.
CPC .............. *E05F 15/63* (2015.01); *E05F 1/105* (2013.01); *H02P 3/12* (2013.01); *H02P 7/04* (2016.02);
(Continued)

(58) Field of Classification Search
CPC ......... E05F 15/63; E05F 15/616; E05F 15/73; E05F 1/105; E05F 1/10; E05Y 2201/41;
(Continued)

(56) References Cited

U.S. PATENT DOCUMENTS 6,316,892 B1    11/2001  Valencia
10,480,236 B2 *  11/2019  Söderqvist .............. E05F 15/63
(Continued)

FOREIGN PATENT DOCUMENTS

DE     102005038331      2/2007
EP       0562153         9/1993
(Continued)

OTHER PUBLICATIONS

International Search Report in PCT/EP2019/065466 dated Sep. 4, 2020.
Swedish Search Report in 1930189-4 dated Dec. 19, 2019.

*Primary Examiner* — Chi Q Nguyen
(74) *Attorney, Agent, or Firm* — Wissing Miller LLP

(57) ABSTRACT

Provided is a swing door operator (110) for moving a door leaf (120) between a first position and a second position. The swing door operator (110) is arranged to operate in a powered and a powerless mode and comprises a permanent magnet DC motor (310). The motor (310) is arranged to move the door leaf (120) at least from the second position to the first position in the powered mode. The swing door operator (110) further comprises a mechanical drive unit (320), arranged to move the door leaf from the first position to the second position in the powerless mode. In the pow- (Continued)

erless mode, at least one resistive device is electrically connected in parallel with the motor (310) and arranged to limit a current generated by the motor (310) in response to the movement of the door leaf (120) from the first position to the second position by means of the mechanical drive unit (320). A method for controlling the swing door operator is also provided.

21 Claims, 7 Drawing Sheets

(51) Int. Cl.
*E05F 15/63* (2015.01)
*H02P 3/12* (2006.01)
*H02P 7/03* (2016.01)

(52) U.S. Cl.
CPC ..... *E05Y 2201/434* (2013.01); *E05Y 2201/46* (2013.01); *E05Y 2201/474* (2013.01); *E05Y 2400/35* (2013.01); *E05Y 2400/40* (2013.01); *E05Y 2400/44* (2013.01); *E05Y 2400/616* (2013.01); *E05Y 2800/11* (2013.01); *E05Y 2800/25* (2013.01); *E05Y 2900/134* (2013.01)

(58) Field of Classification Search
CPC ......... E05Y 2201/422; E05Y 2201/315; E05Y 2015/631; E05Y 2400/33; E05Y 2400/456; E05Y 2400/502; E05Y 2400/54; E05Y 2900/134; E05Y 2400/45; E05Y 2900/132; E05Y 2800/113
See application file for complete search history.

(56) References Cited

U.S. PATENT DOCUMENTS

| | | | | |
|---|---|---|---|---|
| 10,837,212 | B2* | 11/2020 | Hucker | E05F 15/63 |
| 11,072,965 | B2* | 7/2021 | Soderqvist | E05F 15/72 |
| 11,085,222 | B2* | 8/2021 | Soderqvist | E05F 15/603 |
| 11,162,292 | B2* | 11/2021 | Soderqvist | E05F 15/603 |
| 11,199,041 | B2* | 12/2021 | Yulkowski | E05F 15/00 |
| 11,203,893 | B2* | 12/2021 | Soderqvist | E05F 15/72 |
| 11,230,872 | B2* | 1/2022 | Paulsson | E05F 15/60 |
| 11,248,410 | B2* | 2/2022 | Dreyer | E05F 15/603 |
| 11,384,588 | B2* | 7/2022 | Soderqvist | H02P 29/50 |
| 11,536,075 | B2* | 12/2022 | Soderqvist | E05F 1/105 |
| 11,697,960 | B2* | 7/2023 | Soderqvist | E05F 15/63 49/70 |
| 11,735,075 | B2* | 8/2023 | Lee | G09F 19/04 49/31 |
| 2010/0315229 | A1 | 12/2010 | Shin | |
| 2017/0191298 | A1 | 7/2017 | Mair | |

FOREIGN PATENT DOCUMENTS

| | | |
|---|---|---|
| WO | 2006133689 | 12/2006 |
| WO | 2018115063 | 6/2018 |

* cited by examiner

SWING DOOR OPERATOR OPERABLE IN POWERED AND POWERLESS MODE This application is a 371 of PCT/EP2020/065466, filed on Jun. 4, 2020, published on Dec. 17, 2020, under publication number WO 2020/249456, which claims priority benefits from Swedish Patent Application No. 1930189-4, filed on Jun. 13, 2019, the disclosure of which is incorporated herein by reference.

TECHNICAL FIELD

The present invention relates to a swing door operator, and more precisely to a swing door operator operating in a powered mode and a powerless mode wherein the movement of an associated door leaf can be controlled also in the powerless mode.

BACKGROUND

Swing door operators are found in many different places and are very common in e.g. hospitals, care homes, schools and offices. In many of these places, the swing door operators are used to control fire doors, i.e. doors that are designed to withstand fire and/or heat for a minimum period of time. In order for these doors to function correctly and to ensure preservation of e.g. building fire cells, there are specific requirements for swing door operators when used to control fire doors. A swing door operator is typically required to fulfill certain safety standards, e.g. EN 16005 and EN 1154. When used to control a fire door, further requirements apply such as those specified in the normative annex A of EN 1154. The mentioned standards are but a selection of the abundance of international standards that are applicable to swing door operators. One thing that most of the standards have in common, is that they place very stringent requirements on a swing door operator.

The requirements cover vast areas of operation and many different parameters have to be controlled and within certain limits in order for the swing door operator to fulfill the requirements. One such parameter is the torque of the door, both when opening the door and when closing the door. According to standards, the required torque is varying through the opening and closing action and is thus dependent on the angular position of the door leaf.

The requirements listed above are applicable to swing doors operators regardless if they are e.g. electric or hydraulic and the requirements are valid also during power failures. Controlling the torque and the travel speed during closing and opening is simple when having electricity and a controller, but the system has to work also in a powerless mode.

In WO 2018/091639, a door driving mechanism for connecting a door operator to a swing door leaf and fulfilling e.g. EN 1154 is provided. The door driving mechanism comprises a guiding member fixedly arranged to the door leaf; and a driving arm at one end being rotationally driven by the door operator, wherein said driving arm is slidably connected to the guiding member at a fixed position in relation to the door leaf.

One problem with the prior art is that is very difficult to tune the parameters controlling the closing speed and torque in a powerless system.

From the above it is understood that there is room for improvements.

SUMMARY

An object of the present invention is to provide a new type of swing door operator which is improved over prior art and which eliminates or at least mitigates the drawbacks discussed above. More specifically, an object of the invention is to provide a swing door operator that enables the control of the speed of a door leaf also in a powerless mode or operation. These objects are achieved by the technique set forth in the appended independent claims with preferred embodiments defined in the dependent claims related thereto.

In a first aspect, a swing door operator for moving at least one door leaf between a first position and a second position is provided. The swing door operator is arranged to operate in a powered mode and a powerless mode. The swing door operator comprises a permanent magnet DC motor that is arranged to move the door leaf at least from the second position to the first position in the powered mode. Further to this, the swing door operator comprises a mechanical drive unit that is arranged to move the door leaf from the first position to the second position in the powerless mode. Also, the swing door operator comprises, in the powerless mode, at least one resistive device electrically connected in parallel with the permanent magnet DC motor. The at least one resistive device is arranged to limit a current generated by the permanent magnet DC motor in response to the movement of the door leaf from the first position to the second position by means of the mechanical drive unit.

In one variant of the swing door operator, the mechanical unit is further arranged to store energy mechanically when the door leaf is moved from the second position to the first position. This allows the mechanical drive unit to store energy when the movement of the door leaf is provided by the permanent magnet DC motor. Further, this means that there will always be energy mechanically stored in the mechanical drive unit when the door leaf is not in the first position.

In a further variant of the swing door operator, said move of the door leaf from the first position to the second position in the powerless mode by the mechanical drive unit is provided by releasing the mechanically stored energy. This means that this movement is provided by mechanically stored energy and is consequently provided without the need of external power.

In another variant, the swing door further comprises a control unit arranged to control the permanent magnet DC motor. The control unit allows for accurate and power efficient control and verification of the permanent magnet DC motor and also the door leaf.

In yet another variant of the swing door operator, the control unit is operatively connected to a control circuit. The control circuit enables the control unit to be a thinner client, not having to have motor control blocks integrated.

In an even further variant of the swing door operator, the control circuit comprises an H-bridge. The H-bridge allows for accurate control of the permanent magnet DC motor.

In another variant of the swing door operator, it further comprises a power switch arranged to, when the swing door operator operates in the powerless mode, disconnect the control unit and/or the control circuit from the permanent magnet DC motor and to connect the at least one resistive device in parallel with the permanent magnet DC motor. Only having the resistive device connected to the motor enables a controlled discharge of current generated by the motor. The other devices will also affect the current generated and the drive circuits etc. would have to be construed in a way such that it did not provide a second parallel connection across the motor in the powerless mode.

In another variant of the swing door operator, said at least one resistive device is a tunable resistive device. A tunable resistive device allows for the current generated to be tuned either per swing door operator or at the time of installation. It will also be possible to compensate for drift of the system due to e.g. ageing at later stages in the lifetime of the swing door operator. In summary, it will be possible to more accurately, adaptively and customizably control the speed of the door leaf in the powerless mode.

In a further variant of the swing door operator, said at least one tunable resistive device comprises at least one semiconductor element. The semiconductor element allows for cheap and accurate ways of controlling the resistance of the resistive device.

In an even further variant of the swing door operator, the semiconductor element is a transistor arranged with a tunable voltage on a controlling terminal of the transistor. The transistor allows for cheap and accurate ways of controlling the resistance of the resistive device.

In yet one variant of the swing door, the tunable voltage is provided by voltage division of a voltage at a high potential side of the transistor. The voltage is provided by the permanent magnet DC motor and will be proportional to the movement of the door leaf, consequently the voltage of the controlling terminal of the transistor and, in turn, the resistance of the resistive element, will depend on the movement of the door leaf.

In one variant of the swing door, the voltage division is further provided by a potentiometer. The potentiometer allows for tunability and makes it possible to customize the resistive element depending on e.g. design of door leaf etc.

In another variant of the swing door operator, the voltage division is provided by at least one potentiometer and at least one resistor. The combination of a potentiometer and a resistor allows for substantially the full range of the potentiometer to be used without saturating or choke the transistor.

In one variant of the swing door, the potentiometer is a non-volatile digital potentiometer. This allows the voltage of the controlling terminal of the transistor and the resistance of the resistive device to be electrically c. Since the potentiometer is non-volatile, it keeps its settings in the powerless mode.

In a further variant of the swing door operator it is operatively connected to a control system and arranged to receive instructions comprising a resistive setting for the non-volatile digital potentiometer from the control system. This allows remote control of the swing door operator and enables the testing and tuning of the system without sending personnel to the location of the swing door operator.

In yet another variant of the swing door operator, the at least one resistive device is at least two resistive devices. With two devices it is possible to select which one to use and if both are used simultaneously, higher accuracy can be achieved since total tolerances due to e.g. spread of component characteristics is reduced.

In one variant of the swing door operator, it further comprises at least one position switch arranged to sense an intermittent position of the door leaf and to switch which one of the at least two resistive devices that is operatively connectable in parallel with the permanent magnet DC motor depending on the intermittent position of the door leaf. By switching resistive element depending on the positon of the door leaf, it is possible to have different speeds of the door leaf at different parts of the distance between the first positon and the second position—all in the powerless mode.

In yet another variant of the swing door operator, the at least one position switch is a lock kick switch arranged to sense when the intermittent position of the door leaf is less than between 5-15° from the second position, preferably below 15° from the second position. Detecting these particular positions is important since there are regulatory speed requirements for the final degrees of movement of the door leaf and the speed of the door leaf still has to be high enough for the door leaf to fully close and form a tight seal with the door frame.

In another variant of the swing door, the second position corresponds to the door leaf being closed and the first position corresponds to the door leaf being open. This is the typical configuration for fire doors.

In a second aspect, a method is presented for controlling the swing door operator as shown in the first aspect. The method comprises detecting a powerless mode of the swing door operator, providing the resistive device in parallel with the permanent magnet DC motor, and limiting, by the resistive device, the current generated by the permanent magnet DC motor in response to the movement of the door leaf from the first position to the second position by means of the mechanical drive unit.

In a variant of the method, it further comprises the steps of detecting an intermittent position of the door leaf, and switching the resistive device provided in parallel with the permanent magnet DC motor. By switching resistive element depending on the positon of the door leaf, it is possible to have different speeds of the door leaf at different parts of the distance between the first positon and the second position—all in the powerless mode.

BRIEF DESCRIPTION OF THE DRAWINGS

Embodiments of the invention will be described in the following; references being made to the appended diagrammatical drawings which illustrate non-limiting examples of how the inventive concept can be reduced into practice.

DETAILED DESCRIPTION OF EMBODIMENTS

Hereinafter, certain embodiments will be described more fully with reference to the accompanying drawings. The invention may, however, be embodied in many different forms and should not be construed as limited to the embodiments set forth herein; rather, these embodiments are provided by way of example so that this disclosure will be thorough and complete, and will fully convey the scope of the invention, such as it is defined in the appended claims, to those skilled in the art.

Throughout this disclosure different terms and phrasings will be used. A door leaf may, in some sections of the disclosure, be referred to as a door. This is for simplicity reasons and the skilled person will, from context, know that the interpretation of the phrases are the same.

Figure 1:
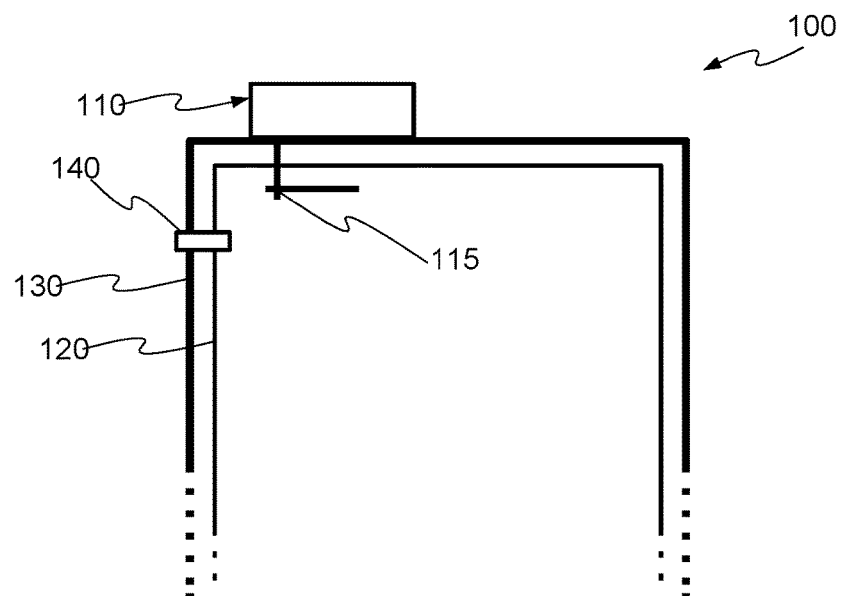
FIG. 1 is a partial view of a swing door assembly.

In FIG. 1, a schematic view of a swing door assembly 100 is shown. The swing door assembly comprises a swing door operator 110, a door leaf 120 and a doorframe 130. The door leaf 120 is connected to the doorframe 130 via one or more hinges 140 and the swing door operator 110 is operatively connected to the door leaf 120 via an axle and lever assembly 115 arranged such that the swing door operator 110 can control the position of the door leaf 120.

Figures 2A, 2B, 2C:
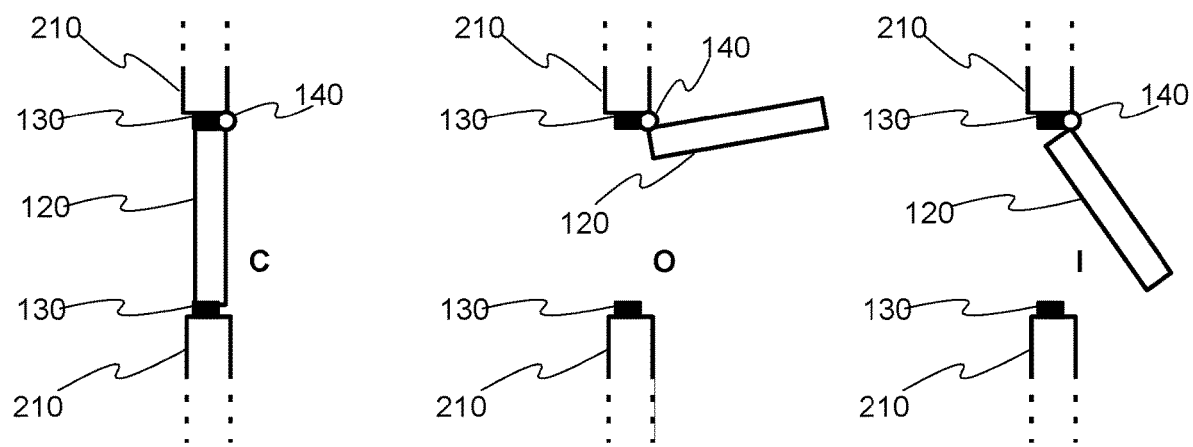
FIGS. 2*a*-*c* are top views of a mounted door leaf in different positions.

The swing door assembly 100 is typically arranged to move the door leaf 120 between a first position O and a second position C. This is exemplified in FIGS. 2a-c showing a top schematic view of a swing door assembly 100 (the swing door operator 110 is not shown) mounted in a wall 210. The a door leaf 120 may be in the first position C, FIG. 2a, the second position O, FIG. 2b, or in an intermediate position I, FIG. 2c, which may mean any position between the first O and the second position C. This is but an example and what constitutes the first position O and the second position C will, in this disclosure, depend on the configuration of the swing door operator 110. If an electrically powered swing door operator 110 is assumed, the second position C of the door leaf 120 is the positon that the swing door operator 110 travels to when it operates in a powerless mode. The powerless mode may be due to power failures in which case many swing door operators 110 are configured such that the second position C corresponds to the door leaf being closed, as shown in FIG. 2a. This is typically the case with fire doors where the door closes to limit the spread of fire. In other cases of power failure or loss of power, the swing door operator 110 may be configured to fully open in the second position C. This may be the case when evacuation is the main purpose of the door assembly 100.

Figure 3A:
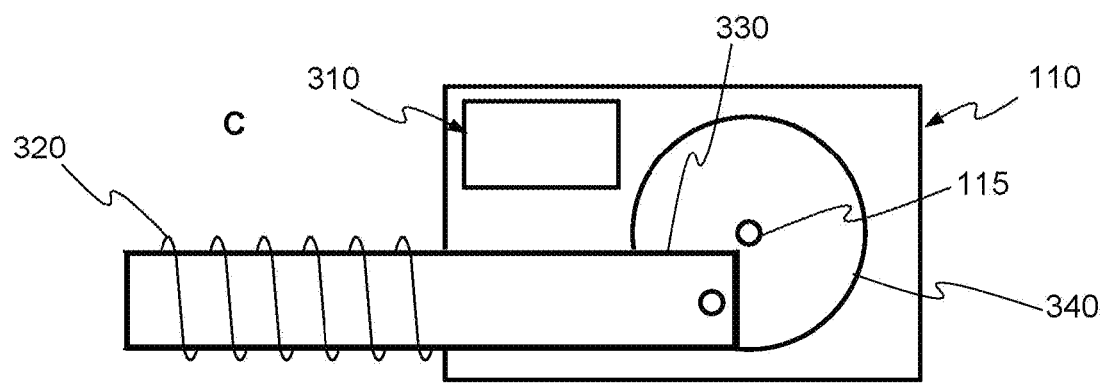
FIGS. 3*a*-3*b* are schematic views of a swing door assembly in different positions.
Figure 3B:
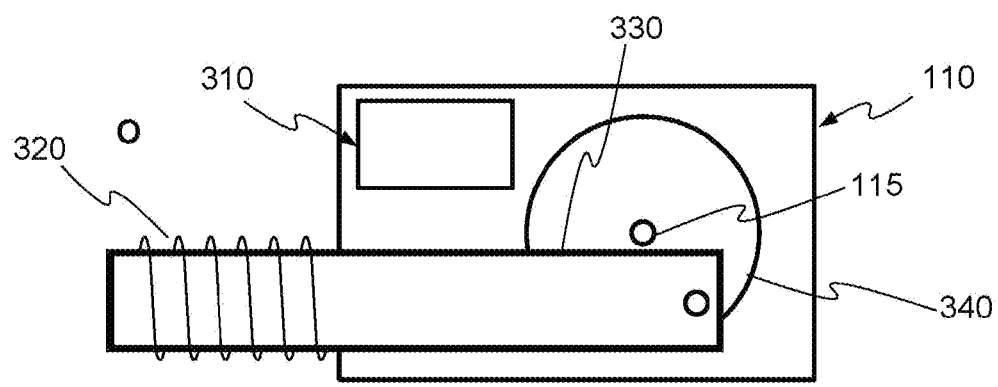

The swing door operator 110 will typically comprise a mechanical drive unit 320 that ensures that the door leaf 120 is placed in the second positon C in the powerless mode. One example of how a swing door operator 110 comprising a mechanical drive unit 320 may be arranged in order to move the door leaf 120 to the second position C in the powerless mode will be explained with reference to FIGS. 3a-b. In FIG. 3a, the swing door operator 110 is arranged to place the door leaf 120 in the second positon C and in FIG. 3b, the swing door operator 110 is arranged to place the door leaf 120 in the first position O. The swing door operator 110 comprises an electrical motor 310 arranged to drive the axle and lever assembly 115 via e.g. a disc 340. Note that the actual connection between the electrical motor 310, the axle and lever assembly 115 and the disc 340 is left out of the illustrations in order to simplify the explanation. This connection may be a direct connection but may also be a complex arrangement with gears and drives. The disc 340 is eccentrically connected to a rod 330 such that when the disc 340 rotates, the rod 330 is moved in a substantially linear movement. This is illustrated by the comparison of FIG. 3a to FIG. 3b wherein it can be seen that the rod 330 has been moved horizontally. Note that the rod 330 is shown as being directly connected to the disc 340, this is for illustrative and simplified explanation purposes. An actual implementation may comprise a geared and complex connection between the rod 330 and the disc 340. With continued reference to FIGS. 3a-b, as the rod 330 is pulled horizontally by the rotation of the disc 340, the mechanical drive unit 320, illustrated as a spring 320 in FIGS. 3a-b, is compressed. The energy storage of the mechanical drive unit 320 is accomplished by the electrical motor 310 providing energy to the mechanical drive unit 320. In the transition from FIG. 3a to FIG. 3b, this is seen as compression of the spring 320 thus mechanically storing energy. If the swing door operator 110 would, when in the first or intermediate position I,O, suffer from a power failure, or if it was instructed to operate in a powerless mode, the mechanical drive unit 320 will release its mechanically stored energy. In FIG. 3b, this equals to the spring 320 expanding, pushing the rod 330 horizontally and forcing a rotation of the disc 340. The scenario can be illustrated as the transition from FIG. 3b to FIG. 3a.

The mechanical drive unit 320 has been illustrated as a spring 320, but it should be emphasized that any suitable means for mechanically storing energy may be used. An alternative, not illustrated, may be a simple weight connected to the door leaf 120 by a string that extends from the door leaf 120 to the weight via e.g. an anchor point in the doorframe 130. Such an arrangement will lift the weight when the door leaf 120 is moved to the first position O by a force and the weight will move the door leaf 120 to the second positon C when the force is removed.

From the teaching presented, it can be derived that as the mechanical drive 320 releases its mechanically stored energy, the electrical motor 310 will be forced to rotate, this is unless a mechanical solution disconnects the electrical motor 310 from the mechanical drive 320. This forced rotation of the electrical motor 310 is one inventive aspect realized by the inventor of this disclosure.

Figure 4:
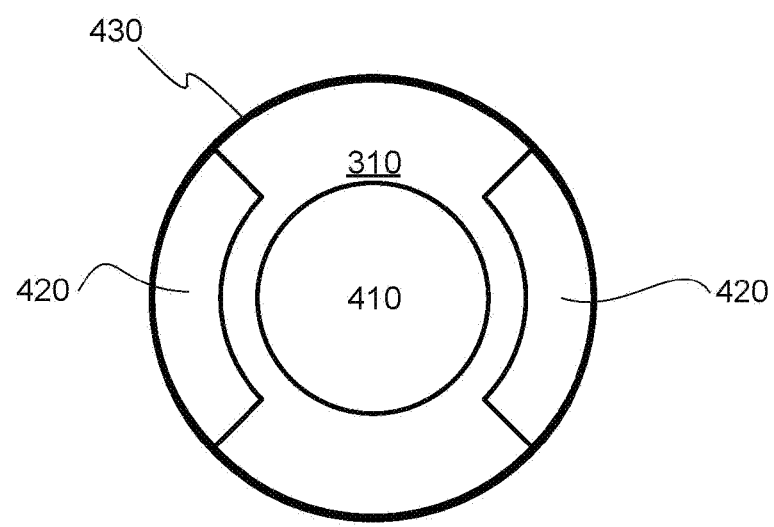
FIG. 4 is a schematic view of an electrical motor.

Electrical motors 310 are well known in the art and a simplified cross sectional schematic view of an electrical motor 310 is shown in FIG. 4. The electrical motor 310 of FIG. 4 comprises a stationary part, a stator 420, typically connected to or part of a housing 430 of the electrical motor 310. The electrical motor 310 further comprises a rotational part, a rotor 410, arranged inside the stator 420. One particular variant of an electrical motor 310 is a Permanent Magnet Direct Current, PMDC, motor 310. In a PMDC motor 310, the stator 420 typically comprises an even number of radially magnetized permanent magnets arranged with alternating magnetic polarization around the housing 430 of the PMDC motor 310. The rotor 410 comprises a number of coils and a commutator where the commutator is arranged to transfer electrical power, typically through brushes although brushless motors are also available, from a power source to the coils of the rotor 410. The commutator will typically be provided with two connectors external to the electrical motor 310 providing connection means for supplying a DC voltage to the PMDC motor 310. The coils are arranged such that the current from the power source induces a magnetic flux in the stator and the stator 420 consequently serves as a return path for the magnetic flux. This interaction between the coils and the permanent magnets causes a torque in and a rotation of the rotor 410. Reversing the polarity of the voltage supplied to the PMDC motor 310 will reverse the rotational direction of the rotor 410. Subjecting the rotor 410 to a torque will allow the PMDC motor 310 to act a generator in the form of a dynamo. This means that the magnetic flux caused by the rotation of the rotor 410 will induce a current in the coils.

Having the electrical motor 310 of the swing door operator 110 realized as a PMDC motor 310 will, when the mechanical drive unit 320 forces a rotation of the PMDC motor 310, cause the PMDC motor 310 to generate a current $I_G$. The function of the PMDC motor 310 will, in this scenario, be much like that of a dynamo.

As mentioned earlier, one challenge with swing door operators 110 is that the requirement for automatic closing and opening speed are valid also in powerless situations. This means it is necessary to control the speed of movement of the door frame 120 also when automatically transitioning from the first position O to the second positon C in powerless mode. By taking advantage of the current $I_G$ generated by the PMDC motor 310 in response to the mechanical drive unit 320 transitioning the door leaf 120 from the first position O to the second position C, the speed of the transitioning can be controlled.

Figure 5:
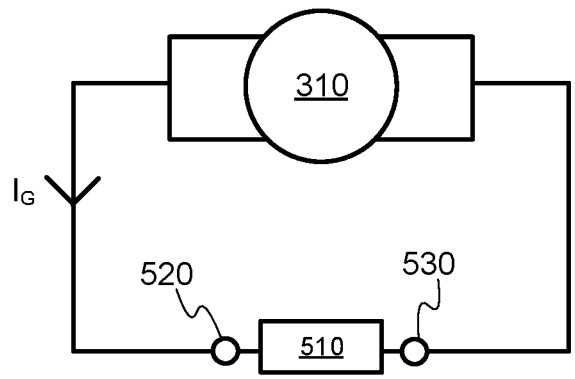
FIG. 5 is a schematic view of an electrical engine connected to a resistive device.

In FIG. 5, the speed control of the door leaf is realized by the introduction of a resistive device 510 in parallel with the PMDC motor 310. The resistive device 510 is arranged to limit the current $I_G$ generated by the PMDC motor 310. This is all in accordance with the very well known Ohm's law which is known to the skilled person and no further details regarding this will be given. When the PMDC motor 310 acts as a generator, the resistive device 510 will limit the current possible to induce in the coils, the magnetic flux generated by the rotation of the rotor 410 and consequently the rotational speed of the rotor 410. This is all caused by the inherent properties of the PMDC motor 310 and the skilled person is well versed in these effects. The resistive device 510 may be provided with a positive connection terminal 520 arranged to receive the current $I_G$ generated by the PMDC motor 310. The resistive device 510 may further be provided with a negative connection terminal 530 arranged to output the current $I_G$.

The resistive device 510 may be any one of, a plurality of or a combination of known resistive devices 510, e.g. a resistor, a potentiometer, a digital potentiometer, a semiconductor device etc.

Figure 6:
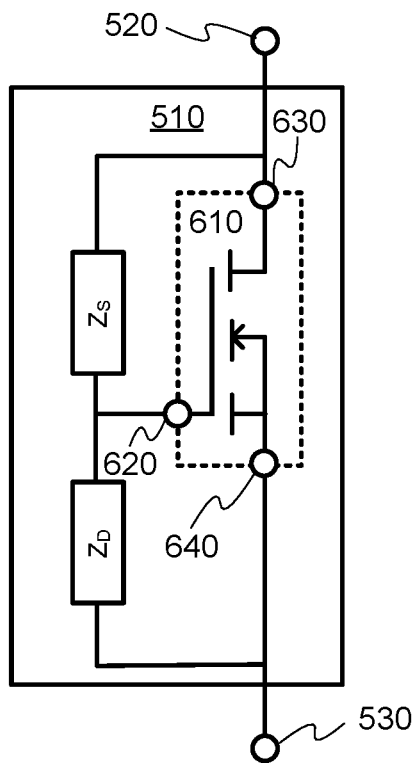
FIG. 6 is a schematic view of one embodiment of a resistive device.

In FIG. 6, one embodiment of the resistive device 510 is realized as a semiconductor device in the form of a transistor 610. The transistor 610 is provided with a controlling terminal 620 corresponding to, depending on the type of transistor used, e.g. the gate or the base of the transistor 610. Further to this, the transistor 610 comprises a high potential terminal 630 corresponding to, depending on the type of transistor used, the collector or the source of the transistor 610. Also, the transistor comprises a low potential terminal 640 corresponding to, depending on the type of transistor used, e.g, the emitter or the drain of the transistor 610. In order to control the current $I_G$ generated when the PMDC motor 310 acts as a generator, the transistor 610 is provided with a controlling voltage at the controlling terminal 620 of the transistor 610. It is well known that a voltage at the controlling terminal 620 of a transistor is used to control the conductivity of the transistor 610. The conductivity will, when used as disclosed herein, be comparable to an impedance. However, this controlling voltage may, as shown in FIG. 6, be the result of a voltage available at the high potential terminal 630 subjected to a voltage division. The voltage division may be provided by a high side impedance $Z_S$ connected between the high potential terminal 630 and the controlling terminal 620 of the transistor 610 and a low side impedance $Z_D$ connected between the controlling terminal 620 and the low potential terminal 640 of the transistor 610. Note that the voltages and potentials mentioned in the explanation given above are typically differential voltages or potentials referencing the low potential terminal 640, i.e. the controlling voltage at the controlling terminal 620 of the transistor is the differential voltage between controlling terminal 620 and the low potential terminal of the transistor 530. Consequently, the term high potential terminal 630 or side is referring to a side with a higher potential than that of a low potential terminal 640 or side.

Figure 7:
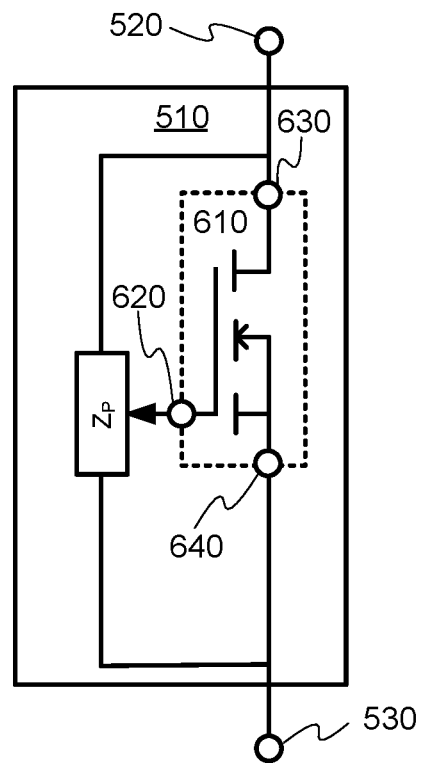
FIG. 7 is a schematic view of one embodiment of a resistive device.

The voltage available at the high potential terminal 630 will be a provided by the permanent magnet DC motor 310 and will be proportional to the movement of the door leaf 120. Consequently, the voltage at the controlling terminal 620 of the transistor 610 and, in turn, the resistance of the resistive element 510, will depend on the movement of the door leaf 120. In other words, the circuitry will act as a closed loop control system. Either of the impedances $Z_D$, $Z_S$ shown in FIG. 6 may, as seen in FIG. 7, be replaced with or extended with e.g. a three terminal potentiometer $Z_P$. Depending on the setting of the potentiometer $Z_P$, the voltage division between the high potential terminal 610 and the low potential terminal 640 of the transistor will change. Consequently, the voltage of the controlling terminal 620 will change and with that the source-drain/collector-emitter conductivity of the transistor 610. Typically, the embodiment shown in FIG. 7 will also comprise either of the impedances $Z_D$, $Z_S$ in order to ensure that the transistor 610 never fully opens or closes regardless of the setting of the potentiometer $Z_P$.

Figure 8:
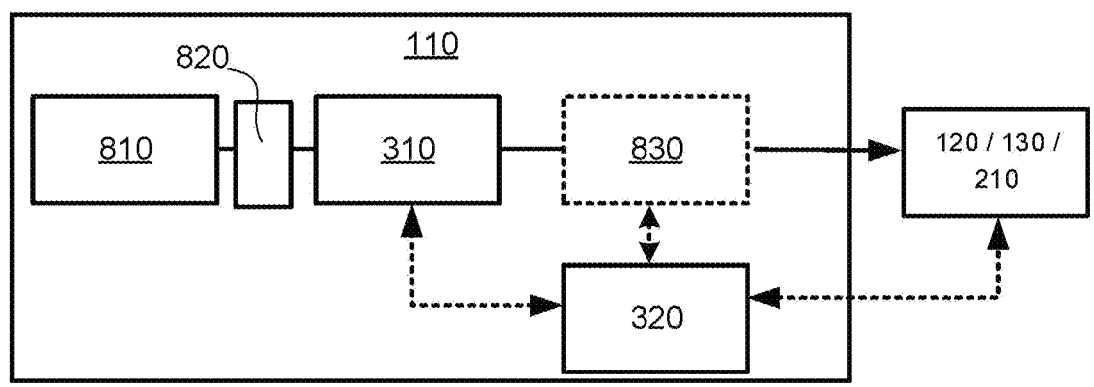
FIG. 8 is a block diagram of the swing door operator.

In FIG. 8, a block diagram of one embodiment of the swing door operator 110 is shown. The swing door operator 110 comprises a control unit 810 that operatively connects to the electrical motor 310 via a control circuit 820. The electrical motor 310 may be connected to a transmission 830 or transmission mechanism 830 before it connects to e.g. the door leaf 120, the doorframe 130 or the wall 210. As mentioned before, the mechanical drive unit 320 may be connected to the electrical motor 310 or to the door leaf 120. The mechanical drive unit 320 may also be connected to the transmission 830 or transmission mechanism 830. Typically, the door swing operator 110 will be connected to a power source, not shown, arranged to supply power to the door swing operator 110 and its active components 810, 820, 310, 830.

The control unit 810 may be any suitable control unit 810 e.g. a microprocessor, MCU, DSP, PLC etc. The control circuit 820 may be any suitable control or driving circuitry and may depend on the control unit 810 chosen. The control circuit 820 may, in some embodiments, comprise an H-bridge for driving the electrical motor 310 and in some embodiments it may be a straight forward electrical network directly connecting the control unit 810 to the electric motor 310 when e.g. the control unit 810 comprises motor driving circuitry—as is the case with some MCUs.

Figure 9:
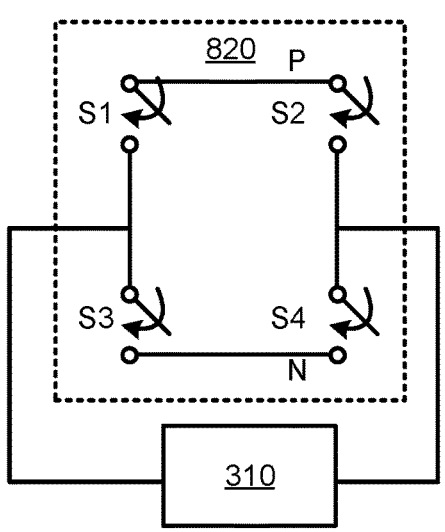
FIG. 9 is a schematic view of the control circuit and the electrical motor.

In FIG. 9, a block diagram is presented depicting the control circuit 820 with a simplified H-bridge arranged to control the electrical motor 310. The H-bridge comprises four switches S1-S4 arranged to control the current though the electrical motor 310. A first side P of the switches S1 and S2 is typically connected to a high potential of the power supply, and a second side N of the switches S3 and S4 is typically connected a low potential of the power supply. The other sides of the switches S1 and S2 are connected to the respective other sides of the switches S3 and S4, and the electrical motor 310 is connected in parallel with these connections as is well known by the skilled person. However, when looking at FIG. 5 and FIG. 9 and placing the resistive device 510 in parallel across the electric motor 310 this will alter the load seen by the H-bridge. Further to this, the state of switches S1-S4 will affect the impedance limiting the current $I_G$ from the electrical motor 310 in the powerless mode.

Figure 10:
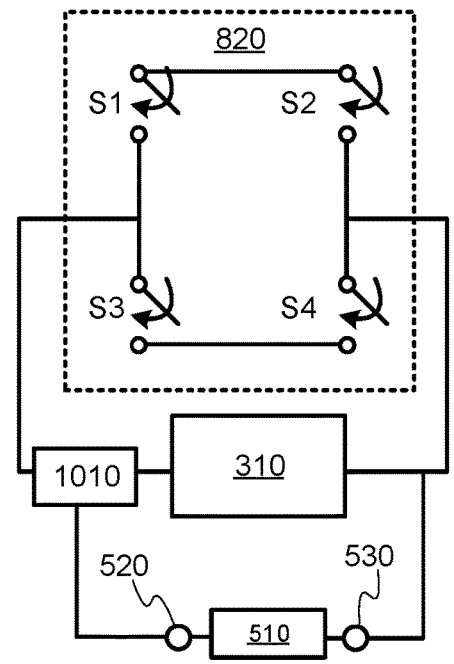
FIG. 10 is a schematic view of the control circuit and the electrical motor and the resistive device.

With reference to FIG. 10, power switch 1010 is arranged as a connection between the control circuit 820, the electrical motor 310 and the resistive device 510. Note that the control circuit 820 shown in the embodiment of the swing door operator 110 in FIG. 10 is an example only. As mentioned, the control circuit 820 may not be necessary depending on e.g. the control unit 810 provided, and the power switch 1010 may in those embodiments be arranged as a connection between the control unit 810, the electrical motor 310 and the resistive device 510. The power switch 1010 is a switch arranged such that the electrical motor 310 is connected in an electrically closed circuit in parallel with the control circuit 820 or the control unit 810 when the swing door operator 110 operates in the powered mode. When the swing door operator 110 operates in the powerless mode, the power switch 1010 is arranged such that the electrical motor 310 is connected in an electrically closed circuit in parallel with the resistive device 510. The power switch 1010 may be realized by one or more relays, transistors or combination thereof, a switch that is in a first position in a powered mode and in a second position in a powerless mode is well known to the skilled person. The power switch 1010 may also be remotely controlled such that its state can be changed and the swing door operator 110 can be forced to function in the powerless mode even if the active devices 810, 820, 310, 830 are still powered. This can be useful for testing, tuning and qualifying the swing door operator 110, and many of the active devices 810, 820, 310, 830 may comprise control logic and sensors that can be used to ensure the function of the resistive device 510. This is extra beneficial when the resistive device 510 is realized as a non-volatile digital potentiometer $Z_P$ since the swing door operator may be tuned and controlled remotely.

Figure 11:
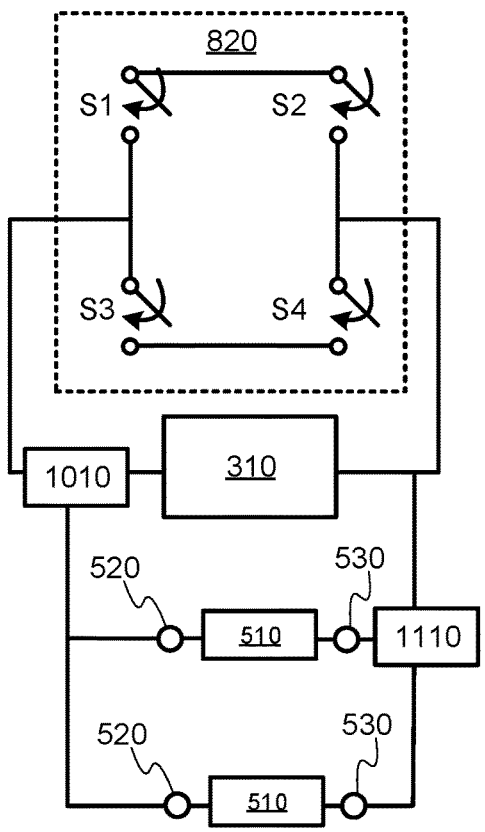
FIG. 11 is a schematic view of the control circuit and the electrical motor and the resistive devices.

In FIG. 11, one embodiment of the swing door operator 110 showing two resistive devices 510 is depicted. Typically, the two resistive devices 510 will have different resistance and/or impedance, either by means of preset fixed resistors or by variable or tunable resistive devices as described earlier with reference to e.g. FIGS. 5-7. A lock kick switch 1110 is arranged to select which of the resistive devices 510 that will be connected in parallel with the electrical motor 310. The circuitry shown in FIG. 11 is shown as comprising also the power switch 1010, but this is an optional feature that may not be necessary in all variants of the embodiment. The lock kick switch 1110 is typically a mechanical switch that switches between the resistive devices 510 depending on the position of the door leaf 120. The lock kick switch 1110 is arranged to switch between the resistive devices 510 at a preset intermittent position I of the door leaf 120 and this may be accomplished in a number of different ways. The lock kick switch 1110 may be located at the door leaf 120, the doorframe 130 or even the wall 210 and arranged such that it can switch at a certain position of the door leaf 120. However, a preferred solution is to place the lock kick switch 1110 internal to the swing door operator 110. This allows the lock kick switch 1110 to detect the position of the door leaf 120 as a function of the position of e.g. the rod 330, the disc 340, the axle and lever assembly 115, the electrical motor 310 or any other suitable part of the swing door operator 110. The embodiment in FIG. 11 is provided with two resistive devices 510 and one lock kick switch 1110. This should not in any way be considered limiting, there can be any number of resistive devices 510 possible to connect in parallel with the electrical motor 310 via any number of lock kick switches 1110. The name lock kick switch 1110 is also not to be considered limiting and it may just as well be named position switch 1110, and any switch not associated with a function may be used and the switches may be arranged to sense any position between the first positon O and the second position C.

One particular of e.g. the EN 1154 standard is that the door must travel the final degrees before closing for a minimum amount time. This is to avoid the door leaf 120 slamming shut and risking injuries of people. There are similar requirements for swing door operators 110 that have the second positon C being an open positon, this is also to avoid injuries and further to reduce the risk of the door leaf 120 damaging e.g. a wall 210 or similar arranged to stop the door leaf 120. Consequently, it may be beneficial to arrange the position switch 1110 such that it switches at a positon that is relevant from a certifications perspective. In one further embodiment, the lock kick switch 1110 is arranged to switch when the door leaf 120 is in an intermittent position I that is 5-15° from the second positon. Preferably, the lock kick switch 1110 is arranged to switch when the intermittent position is below 15° from the second positon C. Applying this embodiment to the non-limiting example of FIGS. 2a-c, the lock kick switch 1110 will switch resistive devices 510 when the door leaf 120 is 15° from closing. Detecting these particular positions is important since there are, in addition to the regulatory speed requirements for the final degrees of movement of the door leaf 120, requirements on proper closing of the door. This means that the door leaf 120 must form a tight seal with the doorframe 130, and this requires a certain speed of movement of the door leaf 120 in order to successfully achieve this. Too slow movement of the door leaf 120 will leave it resting on the doorframe 130 providing a gap where e.g. smoke, fire and/or heat may pass.

The switching of the position switch 1110 will typically occur regardless if the swing door operator 110 operates in a powered or powerless mode. As mentioned, the implementation may be realized with or without the power switch 1010 although an implementation with the power switch 1010 is preferred since the resistive device 510 will, in this case, not affect the operation and control of the electrical motor 320 in a powered mode of operation and vice versa.

Figure 12:
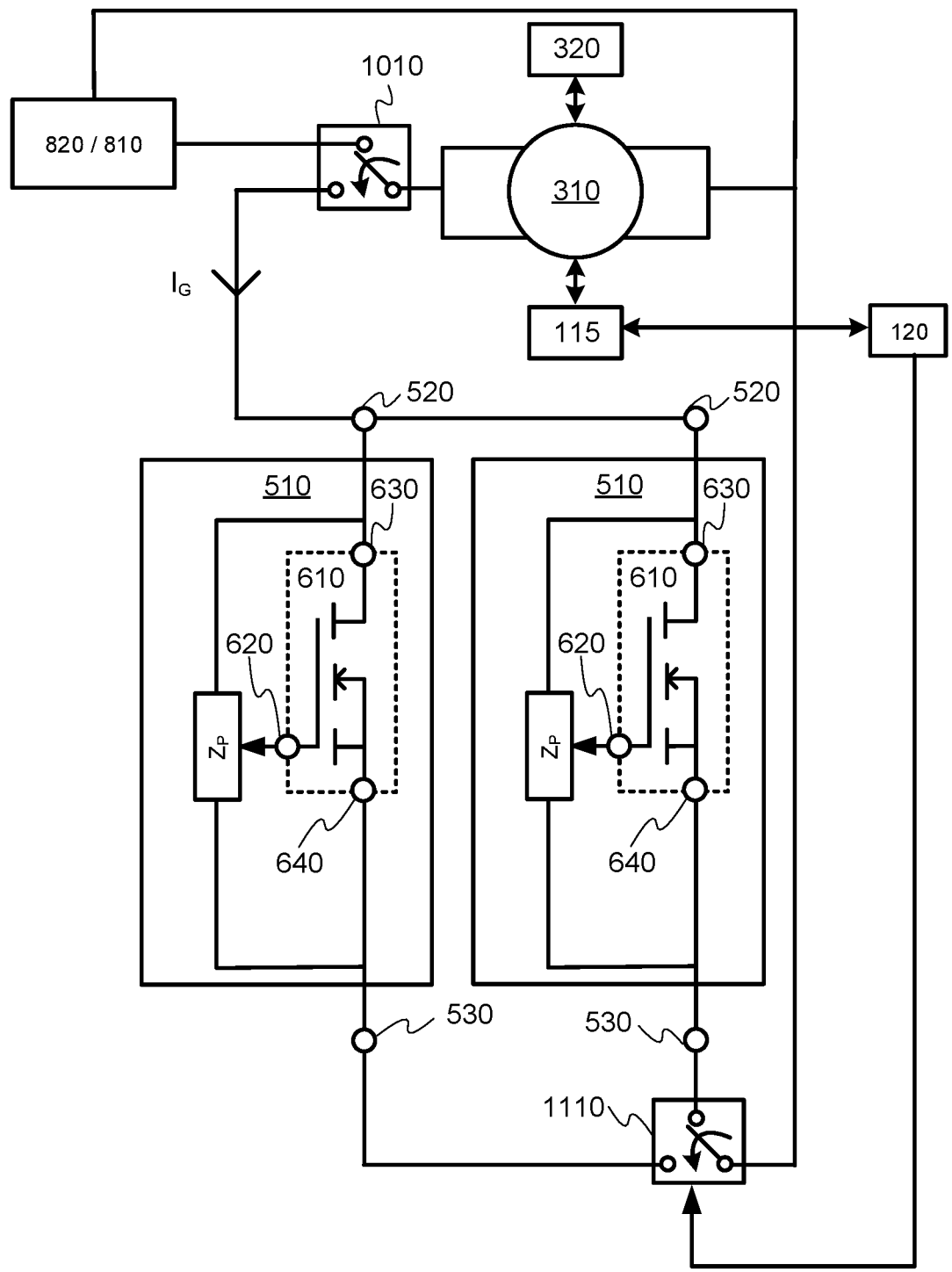
FIG. 12 is a schematic view of the swing door operator arranged to work in powered and powerless mode.

The embodiments listed above are, as mentioned, not limiting and the combination of different embodiments of the resistive device 510 may very well be combined with any combination of the power switch 1010 and/or the lock kick switch 1110. For the sake of completeness, FIG. 12 shows a schematic overview of one embodiment of a swing door operator 110 arranged to operate in a powered and a powerless mode. The mechanical drive unit 320 introduced in FIG. 3 is mechanically and operatively connected to the electrical motor 310. The electrical motor 310 is also mechanically and operatively connected to the axle and lever assembly 115, which in turn is mechanically and operatively connected to the door leaf 120. The door leaf 120 is mechanically and operatively connected to the position switch 1110 such that the position switch 1110 switches depending on the position of the door leaf 120. As mentioned earlier, this may be an indirect connection wherein the position switch 1110 senses a position of e.g. the electrical motor 310, the mechanical drive unit 320, the axle and lever assembly 115 or any other suitable means for determining the position of the door leaf 120. The electric circuit of FIG. 12 comprises the power switch 1010. The power switch 1010 is arranged to switch between having the electrical motor 310, typically a PMDC motor 310, being controlled either by the control unit 810 and/or the control circuit 820 or by one of the resistive device 510 being connected by the position switch 1110. The position switch 1110 is arranged to switch between the two resistive devices 510 depending on the positon of the door leaf 120. When the power switch 1010 is in a positon such that the electrical motor 310 is in a closed electrical circuit with one of the resistive devices 510, any current $I_G$ generated by the electrical motor 310, by means of the mechanical drive unit 310, will be limited by the connected resistive device 510. The mechanical drive unit 310 will typically force the electrical motor 310 to generate current $I_G$ when the door leaf 120 is moved from the first position O to the second position C in the powerless mode. As mentioned, in the powerless mode, the power switch 1010 connects the resistive device 510 in parallel with the electrical motor 310. When the door leaf 120 is at a location, or has passed a location, of a predefined position between the first positon O and the second positon C, the position switch 1110 will switch and change the resistive device 510 connected in parallel with the electrical motor 310. This will change the current that can be induced in the windings of the electrical motor 310 and consequently change the movement speed of the door leaf 120. In other words, the door leaf 120 moves at a first speed that is controlled by a first resistive device 510 until the position switch 1110 is triggered, after which the door leaf 120 moves with a second speed that is controlled by a second resistive device 510. Note that the control of the speed of the door leaf 120 is accomplished without the need of an external power supply, the movement is driven by the mechanically stored energy in the mechanical drive unit 320.

The embodiment shown with reference to FIG. 12 may very well in some embodiments be expanded to comprise more resistive devices 510 of different configuration, see e.g. FIGS. 5-7 and the related description. The embodiment may even, in some variants, have one of the resistive devices realized as a short circuit. Such an embodiment would allow the door leaf 120 to accelerate the highest speed possible to achievable by the swing door operator 110 when it operates in a powerless mode. The position switch 1110 may be expanded to have the same number of throws/positions as there are resistive devices 510 but this would typically require the switch 1110 having more poles in order to allow for an efficient solution. Alternatively, the swing door operator 110 may be extended with further position switches 1110 typically arranged to switch at different locations of the door leaf 120 somewhere between the first position O and the second position C.

Figure 13:
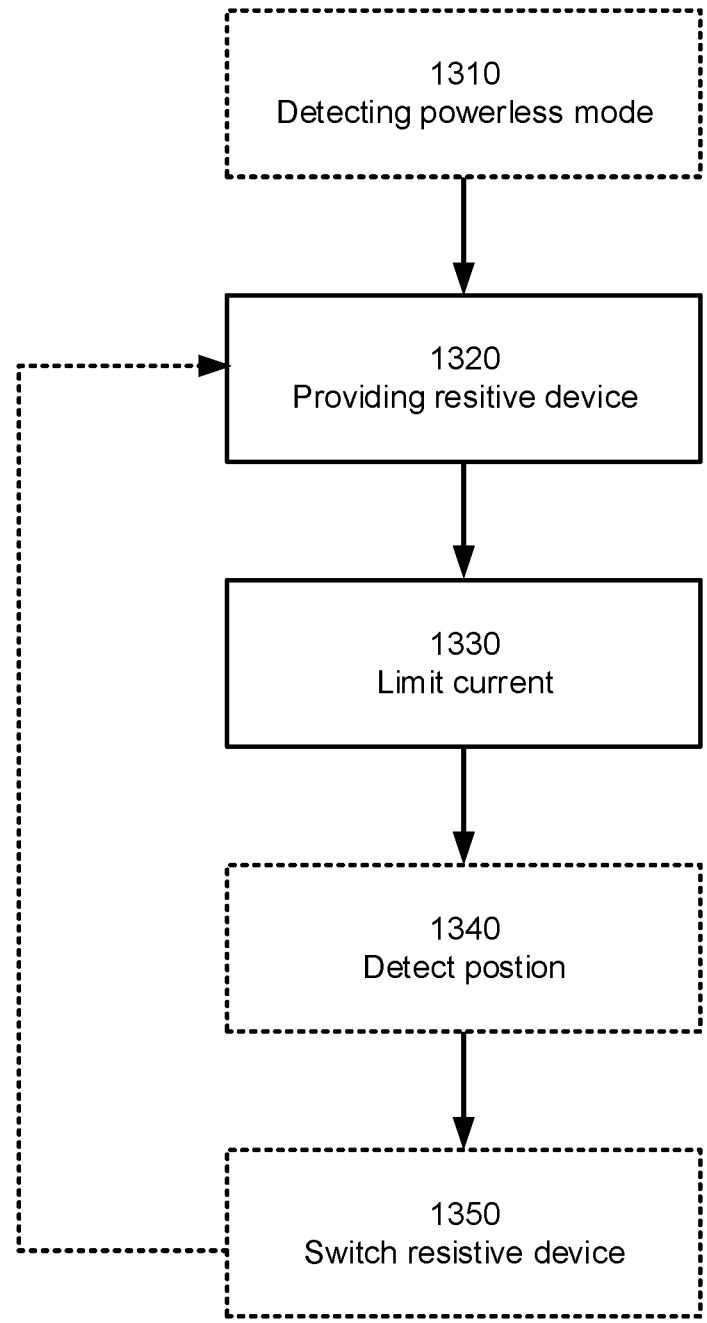
FIG. 13 is a flowchart view of a method of controlling a swing door operator.

Based on the previous sections, a brief description of a method 1300 of controlling the movement of a door leaf 120 by a swing door operator 110 operating in a powerless mode will be described. A block diagram of the method 1300 can be seen in FIG. 13. In a (optional) step of detecting 1310, the method 1300 detects that the swing door operator 110 is in a powerless mode. This may be accomplished by e.g. the power switch 1010 as described in earlier sections. The method 1300 further comprises providing 1320 a resistive device 510 in parallel with the electrical motor 320 of the swing door operator 110. The resistive device 510 is, as has been disclosed, arranged such that the method 1300 can limit 1330 the current $I_G$ generated by the electrical motor 320 when the door leaf 120 is moved by the mechanical drive unit 320. The method 1300 may further comprise the optional step of detecting 1340 the position of the door leaf 120 and further to optionally switch 1350 resistive device 510 depending on the detected position. Further detecting 1340 of position and switching 1350 of the resistive device 510 may be provided as the door leaf 120 moves from the first position O to the second positon C. In FIG. 13, this is shown as a dotted line, since it is optional, connecting the step of switching 1350 resistive device 510 with step of providing 1320 the resistive device 510 in parallel with the electrical motor 320.

REFERENCES $I_G$ generated current
N first side of switches in H-bridge
P second side of switches in H-bridge
$Z_D$ low side impedance element
$Z_S$ high side impedance element
$Z_P$ variable impedance element
100 swing door assembly
110 swing door operator
115 axle and lever assembly
120 door leaf
130 doorframe
140 hinge
210 wall
310 electrical motor
320 mechanical drive unit
330 rod
340 disc
410 rotor
420 stator
430 housing
510 resistive device
520 positive connection terminal
530 negative connection terminal
610 transistor
620 controlling terminal
630 high potential side
640 low potential side
810 control unit
820 control circuit
830 transmission or transmission mechanism
1010 power switch
1110 lock kick switch
1300 method of controlling the movement of a door leaf
1310 method step of detecting mode
1320 method step of providing resistive device
1330 method step of limiting current
1340 method step of detecting position
1350 method step of switching resistive device

The invention claimed is:

1. A swing door operator for moving at least one door leaf between a first position (O) and a second position (C), the swing door operator being arranged to operate in a powered mode and a powerless mode and comprising:
   a permanent magnet DC motor, arranged to move the door leaf at least from the second position (C) to the first position (O) in the powered mode,
   a mechanical drive unit, arranged to move the door leaf from the first position (O) to the second position (C) in the powerless mode, and
   in the powerless mode, at least one resistive device electrically connected in parallel with the permanent magnet DC motor and arranged to limit a current generated by the permanent magnet DC motor in response to the movement of the door leaf from the first position (O) to the second position (C) by means of the mechanical drive unit.

2. The swing door operator according to claim 1, wherein the mechanical unit is further arranged to store energy mechanically in response to movement of the door leaf from the second position (C) to the first position (O).

3. The swing door operator according to claim 2, wherein said movement of the door leaf from the first position (O) to the second position (C) in the powerless mode by the mechanical drive unit is provided by releasing the mechanically stored energy.

4. The swing door operator according to claim 1, further comprising a control unit arranged to control the permanent magnet DC motor.

5. The swing door operator according to claim 4, wherein the control unit is operatively connected to a control circuit.

6. The swing door operator according to claim 5, wherein the control circuit comprises an H-bridge.

7. The swing door operator according to claim 5, further comprising a power switch arranged to, when the swing door operator operates in a powerless mode, disconnect the control unit and/or the control circuit from the permanent magnet DC motor and to connect the at least one resistive device in parallel with the permanent magnet DC motor.

8. The swing door operator according to claim 1, wherein said at least one resistive device is a tunable resistive device.

9. The swing door operator according to claim 8, wherein said at least one tunable resistive device comprises at least one semiconductor element.

10. The swing door operator according to claim 9, wherein the semiconductor element is a transistor arranged with a tunable voltage on a controlling terminal of the transistor.

11. The swing door operator according to claim 10, wherein the tunable voltage is provided by voltage division of a voltage at a high potential side of the transistor.

12. The swing door operator according to claim 11, wherein the voltage division is further provided by a potentiometer.

13. The swing door operator according to claim 12, wherein the potentiometer is a non-volatile digital potentiometer.

14. The swing door operator according to claim 13, wherein the swing door operator is operatively connected to a control system and arranged to receive instructions comprising a resistive setting for the non-volatile digital potentiometer from the control system.

15. The swing door operator according to claim 11, wherein the voltage division is provided by at least one potentiometer and at least one resistor.

16. The swing door operator according to claim 1, wherein the at least one resistive device is at least two resistive devices.

17. The swing door operator according to claim 16, further comprising at least one position switch arranged to sense an intermittent position (I) of the door leaf and to switch which one of the at least two resistive devices that is operatively connectable in parallel with the permanent magnet DC motor depending on the intermittent position (I) of the door leaf.

18. The swing door operator according to claim 17, wherein one of the at least one position switch is a lock kick switch arranged to sense when the intermittent position (I) of the door leaf is less than about 15° from the second position (C).

19. The swing door operator according to claim 1, wherein the second position (C) corresponds to the door leaf being closed and the first position (O) corresponds to the door leaf being open.

20. A method for controlling the swing door operator of claim 1, the method comprises:
   detecting the powerless mode of the swing door operator,
   providing the resistive device in parallel with the permanent magnet DC motor, and
   limiting, by the resistive device, the current generated by the permanent magnet DC motor in response to the movement of the door leaf from the first position (O) to the second position (C) by means of the mechanical drive unit.

21. The method according to claim 20, further comprising the steps of:
   detecting an intermittent (I) position of the door leaf, and
   switching the resistive device provided in parallel with the permanent magnet DC motor.

* * * * *